United States Patent [19]
Tillotson

[11] 3,942,505
[45] Mar. 9, 1976

[54] LAWN MOWER STARTING INTERLOCK

[75] Inventor: Henry B. Tillotson, Minneapolis, Minn.

[73] Assignee: The Toro Company, Minneapolis, Minn.

[22] Filed: Aug. 5, 1974

[21] Appl. No.: 494,895

[52] U.S. Cl. .................. 123/179 K; 74/6; 74/850; 123/179 SE; 123/185 BA
[51] Int. Cl.² .. G05G 5/08; F02N 3/02; F02N 15/06
[58] Field of Search....... 123/179 K, 179 SE, 185 B, 123/185 BA; 74/6

[56]         References Cited
         UNITED STATES PATENTS

| | | | |
|---|---|---|---|
| 1,231,637 | 7/1917 | Nikonow | 123/179 K |
| 2,998,809 | 9/1961 | Thomas | 123/179 K |
| 3,739,763 | 6/1973 | Berry et al. | 123/179 K |
| 3,741,187 | 6/1973 | Niebur | 123/179 K |
| 3,782,350 | 1/1974 | McBride | 123/179 K |

Primary Examiner—Allan D. Herrmann
Attorney, Agent, or Firm—Merchant, Gould, Smith, Edell, Welter & Schmidt

[57]          ABSTRACT

A lawn mower starting interlock for gas powered mowers for preventing engagement between the starting pinion and flywheel thereof when the mower is in a predetermined condition, for example, when the mower wheel drive mechanism is engaged. A pivotable lever which may be pivoted into the path of advance of the starter pinion in a Bendix type starter as the starter pinion advances along a helical worm gear towards engagement of a flywheel is disclosed. The lever may be pivoted by means of a bowden wire arrangement, the opposite end of which is attached to the mower drive engagement mechanism or a linkage which moves therewith.

9 Claims, 9 Drawing Figures

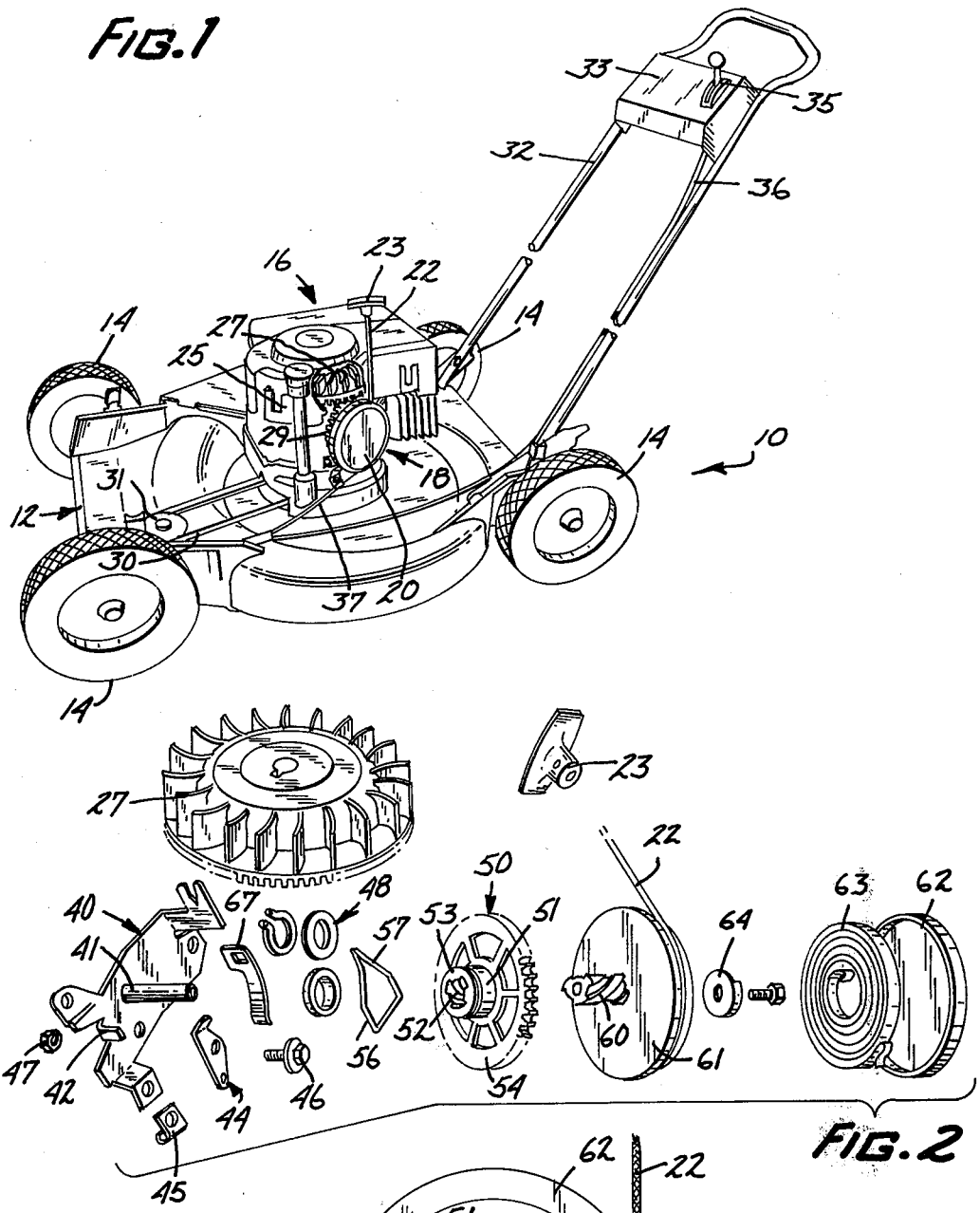
FIG. 1
FIG. 2
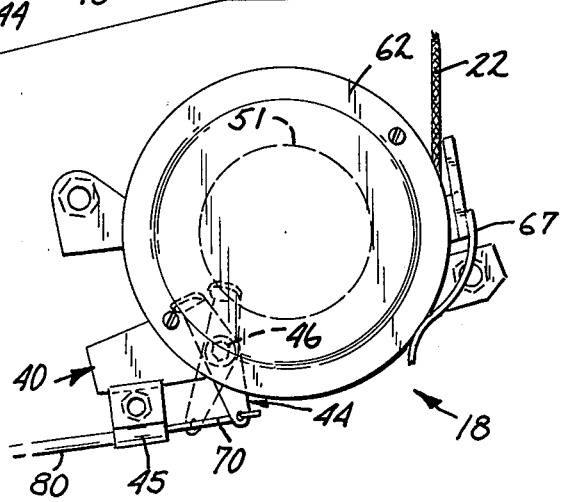
FIG. 8

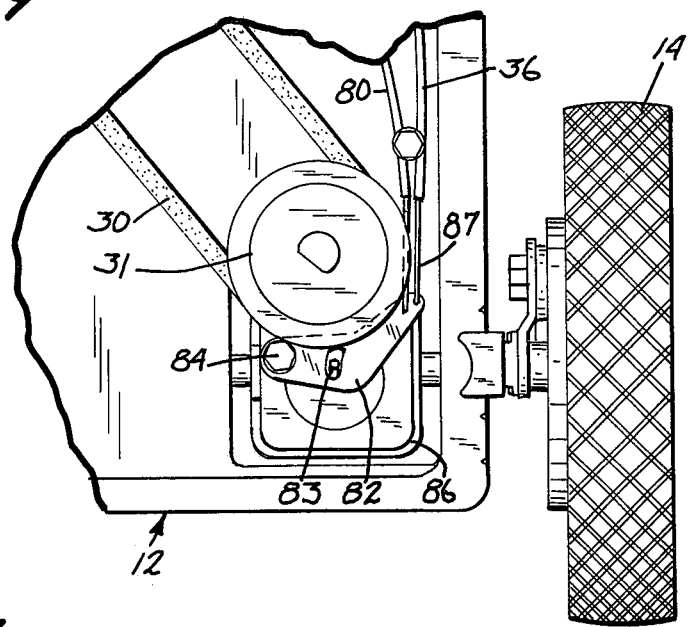
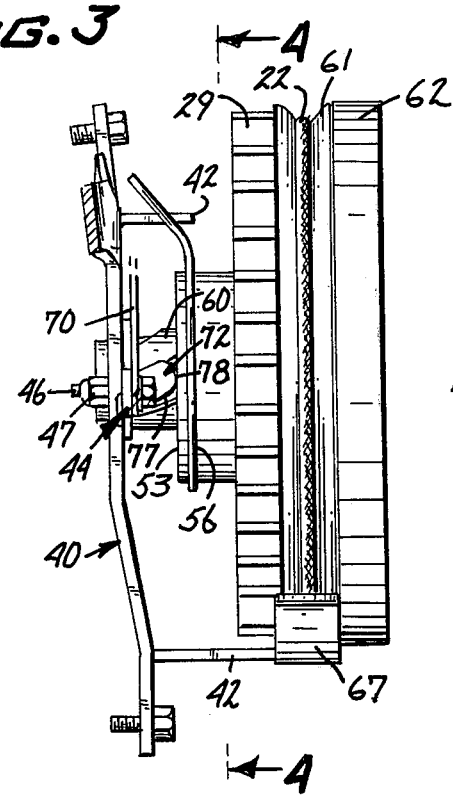
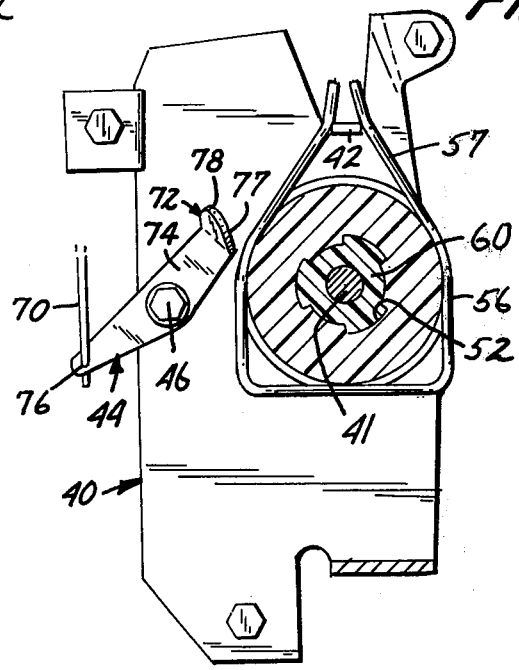
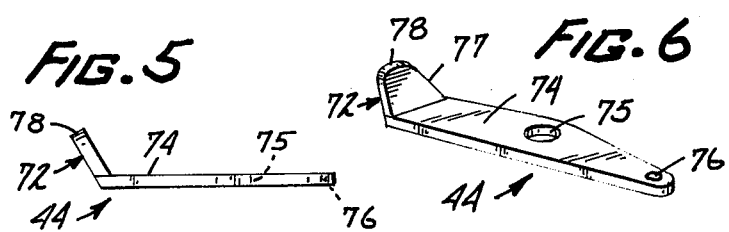

LAWN MOWER STARTING INTERLOCK

BACKGROUND OF THE INVENTION

The present invention relates generally to lawn mower starting mechanisms and more particularly concerns a mechanical interlock mechanism which, under certain conditions, prevents starting of an engine powered mower of the type in which the starter pinion advances into engagement with the flywheel during the starting process.

Due to certain safety considerations, it is sometimes desirable to prevent engagement between the starter pinion and flywheel to protect against starting of the engine of a gas powered lawn mower when the lawn mower is in a predetermined condition. One condition in which this may be highly desirable, applies to self-propelled gas powered mowers, that is, mowers in which the engine also provides forward drive for the mower. With such mowers, it is advantageous to have a mechanism preventing starting of the engine with the wheel drive mechanism engaged. Starting of the mower with the drive engaged could possibly result in operator loss of control, with the attendant hazards such loss of control involves.

It is known to provide an electronic module on mowers which senses engagement and disengagement of the wheel drive mechanism, and electrically prevents starting by grounding the magneto on said mowers during engagement when the motor is not operating. It is, however, necessary to provide such modules with a built-in memory feature, so that they do not ground the magneto each time engagement occurs, but only when starting is attempted with the drive engaged. Such modules and their sensors are unusually expensive and complicated in design, and due to their complicated design, of questionable reliability.

One example of a mechanical starter interlock is found in U.S. Pat. No. 3,739,763 issued to R. J. Berry et al. The Berry et al patent discloses an interlock mechanism for use with Bendix type recoil starters in which a starter pinion advances up a helical worm gear to engage the engine flywheel. The mechanism disclosed in Berry et al is an engine clutch actuated linkage which forces a leg of a starter spring carried on the starter pinion to engage a slot in a bracket, thereby impeding advance of the starter pinion into engagement with the flywheel during clutch engagement.

The starting interlock apparatus of the present invention was developed to provide a positive acting, highly reliable yet inexpensive lock-out device. It should be understood that the lock-out apparatus of the present invention is not limited to applications preventing engine starting during engagement of a mower drive mechanism. On the contrary, the invention could, of course, be used to prevent engine starting in response to other predetermined conditions of the mower.

SUMMARY OF THE INVENTION

In accordance with the invention, a starter interlock for preventing starting of a gas powered mower of the type in which a starting pinion advances axially into engagement with a flywheel is provided. The pinion carries means defining an annular surface that is fixed with respect to the pinion and concentric about the pinion axis. The interlock includes obstruction means, for example, a pivotable lever having an ear thereon which are actuatable to move into the path of pinion advance, to impede the advance to contact the annular surface of the pinion into engagement with the flywheel. The apparatus also includes actuator means responsive to the predetermined mower condition in which starting lock-out is desired to actuate the obstruction means. One example of a condition in which starting lock-out may be desired is during engagement of the drive mechanism of a self-propelled lawn mower.

BRIEF DESCRIPTION OF THE DRAWINGS

Further advantages and features of the invention will become apparent upon a reading of the following detailed description and upon reference to the associated drawings. Referring particularly to the drawings, wherein the use of like reference numerals throughout the several views indicates like elements:

FIG. 1 is a side perspective view of a rotary lawn mower constructed according to one embodiment of the present invention, portions of the engine assembly being cut away to show the mounting of a recoil engine starting mechanism thereon;

FIG. 2 is an exploded view of a conventional recoil Bendix type starter incorporating one embodiment of the present invention, also showing an engine flywheel which the starter pinion engages;

FIG. 3 shows an edge view of the starter mechanism of FIG. 2, and is illustrative of the operation of a pivotable lever which prevents starter pinion and flywheel engagement;

FIG. 4 is a sectional view of the apparatus of FIG. 3 taken along line 4—4 thereof;

FIGS. 5, 6 and 7 are edge, perspective and side views respectively of a pivotable lever constructed according to an embodiment of the present invention;

FIG. 8 is a plan view of a starter assembly provided with an embodiment of the present invention and a pivotable lock-out lever in dotted line form; and FIG. 9 is a fragmentary plan view of a portion of the mower of FIG. 1 showing the interaction between the drive engage mechanism and connection of the lock-out mechanism actuator thereto.

The invention will now be described in connection with preferred embodiments thereof. However, it should be clear that the invention is not limited in scope to those embodiments. All alternatives, modifications and equivalents included within the spirit and scope of the invention as defined by the appended claims are covered.

DETAILED DESCRIPTION OF THE INVENTION

Turning now to the drawings, FIG. 1 is a side perspective view of a gas powered rotary lawn mower generally designated 10. Lawn mower 10 incorporates one preferred embodiment of the starting interlock apparatus of the present invention. Rotary lawn mower 10, which may be of any conventional design, is configured about a housing 12 in which a cutting blade is mounted for rotation about a substantially vertical axis. Housing or deck 12 has mounted thereon four wheels 14 which control the height of the cutting blade above the lawn over which it moves. The cutting blade is driven by a gas powered engine designated 16, the gas tank therefor being removed and a portion of the housing surrounding the engine flywheel cut away for the purpose of more clearly illustrating incorporation of the present invention into the mower. Gas powered engine 16 may be of any conventional type in which the engine is started by driving the flywheel with a starter pinion which advances along a path into engagement with the flywheel during the starting sequence. Mounted on one side of engine 16 is a recoil starter assembly generally designated 18. In the embodiment shown, this is a conventional Bendix type starter. Depicted for clarity as extending vertically upward from a spring-biased pulley assembly 20 portion of starter 18 is a starter cord 22 with a starter handle 23 fastened at one of its ends. Engine 16 has a shroud 25 covering its flywheel but a portion thereof is broken away in the figure to reveal a flywheel 27 with cooling vanes on its upper face and gear teeth cut into its lower face.

For normal operation in the starting sequence, when the lock-out mechanism is not actuated, an operator will grasp starter handle 23 and exert an upward pull thereon. This causes the starter cord 22 to unwind from spring-biased pulley 20, at the same time causing the starter pinion 29 to advance into engagement with the gear surface of flywheel 27 and rotatably to drive the flywheel for starting of the engine 16.

Rotary lawn mower 10 in the specific embodiment shown is a self-propelled mower. Motive force for propulsion of mower 10 is provided from gas powered engine 16 to a front wheel drive mechanism (not shown) by means of a belt and pulley arrangement including a belt 30 and front drive pulley 31. Belt 30 also may extend around a pulley attached to the drive shaft of engine 16 (not shown in FIG. 1). Rotary lawn mower 10, as is typical, will normally be operated with a shroud or a housing covering the drive mechanism, but the housing is not shown in FIG. 1 to facilitate discussion of the present invention.

Rotary lawn mower 10 is provided with an operator handle 32 for control of mower 10 by an operator during lawn care. Mounted near the top of operator handle 32 is an operator console 33 having a two position drive engagement lever 35 thereon. Connected to drive engagement lever 35 is bowden wire arrangement 36 which extends downward and forward to a portion of a front wheel drive mechanism (shown in FIG. 9). In the specific lawn mower shown, drive engagement lever 35 and bowden wire arrangement 36 provide a convenient means for operator control of engagement of the wheel drive mechanism of the mower.

Extending between the front wheel drive mechanism and recoil starter assembly 18 is an interlock actuator bowden wire 37 fastened by means of a bracket to a portion of the engine housing. Bowden wire 37 provides an actuating link between the wheel drive mechanism and the obstruction means which accomplishes the starter interlock function in accord with the present invention, as will be more clearly understood after reference to the description accompanying FIG. 9.

Referring now to FIG. 2, there is depicted an exploded view of recoil starter assembly 18 and engine flywheel 27. Although the starter assembly shown in FIG. 2 is a conventional Bendix-type starter assembly, the present invention is applicable to any starter assembly in which a starter pinion advances along a path into engagement with an engine flywheel, especially where such advancement is caused by a spring drag effect as is typically used with Bendix-type starter mechanisms. In FIG. 2, starter assembly 18 includes a mounting bracket 40 carrying a shaft 41, and upwardly formed brake spring engaging tab 42, and a number of holes therein for mounting bracket 40 to an engine shroud and for mounting of a pivotable obstruction lever 44. Bracket 40 also includes a first ear projecting generally transversely to the body thereof with a V-shaped notch aiding in control of starter cord position and a second ear on mounting bracket 40 acting as a bowden wire holding bracket 45 for fastening the outer casing of the actuator linkage for lever 44. Lever 44 pivots about an axis defined by a shouldered, integral washer, machine screw 46 inserted into a hole in bracket 40 and fastened by means of a locknut 47. Received on shaft 41 is a snap ring and thrust washer assembly generally designated 48 which provides a bearing surface for a face of the starter pinion which advances into contact with the thrust washer face during the engine starting sequence.

A starter pinion generally designated 50 is shown in FIG. 2. Starter pinion 50 has gear teeth spaced about the circumference thereof for engagement with engine flywheel teeth to transfer starting drive from pinion to flywheel. Pinion 50 includes a central hub 51 with a helical worm gear formed into the wall of an axial recess 52 therein. Hub 51 has a hub front face 53 and the pinion includes pinion face 54, both of which are generally annular in shape and extend generally perpendicular to the pinion axis. A circular groove 55 extends circumferentially about the cylindrical outer surface of hub 51 for receipt of a brake spring 56 therein.

Brake spring 56 has three joined rectangular legs, portions of which are received in groove 55 and tangentially contact the groove surface. Brake spring 56 also includes two legs 57 which extend generally outward and approach one another in a V-shape, but legs 57 are not fastened to one another. These legs ride along either side of tab 42 axially thereof to prevent rotation of spring 56 during advancing travel of pinion 50 along its axis.

Recess 52 of pinion 50 mates with a shaft 60 on which a helical worm gear is also formed. Shaft 60 is in turn fixed to a pulley 61 about which starter cord 22 is wound. Also fastened to pulley 61 by means of a spring cover 62 is the outer end of a spiral rewind spring 63.

In assembly, shaft 41 receives thrust washer arrangement 48, then pulley 61, on the shaft 60 of which pinion 50 is received. The inner end of spring 63 is then fastened to shaft 41 by means of retainer 64 and an associated screw. Thus spring 63 acts between pulley 61 and shaft 41. Brake spring 56 is, as previously mentioned, received in the groove 55 on pinion 50. A spring clip 67 is fastened to bracket 40 to control cord 22. Pivotable obstruction lever 44 is mounted to bracket 40 so that the ear thereof may travel in and out of the path of front hub face 53 of pinion 50 during lever travel.

FIG. 3 is an edge view of recoil starter assembly 18 having one embodiment of the present invention incorporated therein. In that figure, pivotable obstruction lever 44 is shown attached to a bowden wire 37 by means of an offset end 70. In the position shown in FIG. 3, an ear 72 of obstruction lever 44 is clearly visible. This ear extends outward at an angle to the pivot axis of lever 44. Ear 72 engages front face 52 of starter pinion 50 to prevent axial advance of pinion 50 into engagement with the engine flywheel when lever 44 is in the position of FIG. 3. However, lever 44 is pivotable, so that, upon actuation by bowden wire 37, ear 72 rotates out of the path of advance of hub face 52 to permit sufficient axial advance of the starter pinion for engagement between pinion and flywheel.

In situations when the wheel drive mechanism is engaged, bowden wire 70 will, of course, pivot lever 44 into a position where ear 72 lies in the path of advance of the starter pinion hub. Assume, in such a situation, that an operator attempts to start the engine by exerting an upward pull on starter handle 23, causing extension of starter cord 22 and consequent rotation of pulley 61 and shaft 60. Due to the mating helical gear arrangement, rotation of pulley tends to result in like rotation of pinion 50. However, a braking effect on pinion 50 is caused by spring 56. The engagement of spring 56 with tab 42 prevents spring rotation, and the resulting drag causes pulley 50 to advance axially along helical worm shaft 60 toward contact with the flywheel. This is prevented by ear 72 of lever 44. Ear 72 contacts hub face 53 and prevents axial pinion advancement. Therefore, if attempts are made to start the engine with the wheel drive mechanism engaged, pinion 50 will advance until hub face 53 contacts ear 72, then will rotate with pulley 61, resulting in two effects: slippage between the rectangular legs of brake spring 56 and groove 55, and sliding contact between ear 72 and annular hub face 53.

FIG. 4 is a sectional view taken along line 4—4 of FIG. 3, with the exception that in FIG. 4, pivotable lever 44 is rotated so that ear 72 is located out of the path of advance of hub 51. Of particular interest in FIG. 4 are the sections showing the mating helical worm engagement between pinion 50 and shaft 60 of pulley 61 and the mounting of shaft 60 axially of shaft 41 for rotation about the axis defined by shaft 41. Also shown with clarity in FIG. 4 is engagement between tab 42 and brake spring 56 along the two extended legs 57 of spring 56. As previously alluded to, stationary tab 42 prevents substantial rotation of spring 56, and consequently provides the braking necessary to cause pinion 50 to move axially along the helical worm to engage either the ear 72 or the thrust washer 48, depending upon whether or not the interlock apparatus of the present invention is active. As will be apparent from study of FIGS. 3 and 4, it may be desirable to have the height of ear 72 above its body portion less than the axial height of hub 51 so that lever 44 need be pivoted only out of the path of the advancing hub rather than translated or otherwise withdrawn completely from the path of pinion advance.

FIGS. 5, 6 and 7 illustrate a preferred embodiment of an obstruction lever suitable for use in the present invention. In this instance, lever 44 has a body 74 with a circular pivot hole 75 located centrally thereof. A smaller hole 76 for insertion of an offset bowden wire end for driving of the lever and pivoting movement about the axis of hole 75 is also provided.

At the opposite end is ear 72 which, as shown particularly in FIG. 5, extends upward from the generally planar body portion 74 at a slightly obtuse angle. Ear 72 may have a ramp engagement surface 77 leading to a gently rounded top surface 78 thereon. Ramp surface 77 aids in promoting smooth engagement between the ear and hub 51 of pinion 50 while top surface 78 is gently rounded and smooth to prevent gouging of the pinion face when the pinion is rotatably driven in contact with the face. Although any other materials of suitable strength and toughness could be used for both pinion and lever members, to prevent gouging and to provide a smooth and workable mechanism, a preferred material for these members, which will experience substantial sliding contact in interlock operation, would be nylon.

FIG. 8 is a plan view of starter assembly 18 helpful in understanding operation of the present invention since it shows pivotable obstruction lever 44 in two positions. The first position, in which the actuated end of the lever is shown in solid line form, is a position maintained by bowden wire 37 when the wheel drive mechanism is disengaged. The second position is that into which lever 44 is pivoted when the wheel drive is engaged. Hub face 52 is represented by a dotted line circle in FIG. 8. In the second position, a portion of ear 72 of the lever extends within the circle representing the advance area of hub face 52, thereby illustrating the obstruction presented by the lever.

Also shown assembled in FIG. 8 is bracket 45 which holds a bowden wire casing 80 surrounding inner retractable end 70, which, of course, shifts to pivot lever 44 and the assembled position of spring clip 67 which aids in guiding and captivating starter cord 22.

The opposite end of the bowden wire arrangement 37 of FIG. 8 appears in the fragmentary plan view of the front wheel drive mechanism shown in FIG. 9. In that view, bowden wire arrangement 36 leads to a shifter arm 82 which pivots to transmit drive engagement and disengagement positions to a shifter rod 83 moved laterally by pivoting of shifter arm 82. Shifter arm 82 pivots about an axis defined by an integral washer or machine screw 84. Shifter rod 83 transfers the shift position into a gear box 86 to cause engagement or disengagement of the wheel drive to the mower. Pivoting movement of shifter arm 82 for engagement and disengagement is accomplished by means of extension and retraction of a bowden wire end 87 which transmits pivoting movements of drive engagement lever 35 to the wheel drive mechanism. The resultant movement of shifter arm 82 is then picked up and transferred by means of one end of bowden wire 37 to pivot lever 44 into a position of obstruction during times when the wheel drive mechanism is engaged and clearance for pinion advance when the drive mechanism is out of engagement.

It will be apparent that many other linkages for actuation of the obstructing member could be devised and that the present invention is not limited to the particular actuating linkage shown. Further, it should be understood that while the embodiments shown result in obstruction of starter pinion advance by means of pivotal movement of a lever with an ear thereon into contact with the pinion hub, any face of the pinion or any suitable annular attachment to the pinion would also be acceptable. It would also be possible to substitute a plunger pin for a pivotable lever as the obstruction means according to the present invention.

Various other alternatives and modifications will be apparent to those of skill in the art in light of the foregoing description. Accordingly, all alternatives and variations included within the spirit and scope of the invention as defined by the appended claims are covered.

What is claimed is:

1. Mower starter interlock apparatus for preventing starting of a mower engine of the type in which a starting pinion advances along a path into engagement with a flywheel thereof when a mower is in a predetermined condition, comprising:
   a. means defining an annular surface that is fixed with respect to said pinion and concentric about the pinion axis;
   b. obstruction means mounted to said engine and actuatable to move into the path of advancement of said starting pinion and contact said annular surface to prevent engagement of said pinion with said flywheel; and c. actuator means for sensing the predetermined condition and connected to said obstruction upon sensing of the predetermined condition.

2. The structure of claim 1 wherein said obstruction means comprises a pivotable lever having an obstruction portion thereon, said lever being fastened to a portion of said mower for pivotal movement of said obstruction portion into and out of the path of advance of said annular surface.

3. The structure of claim 2 wherein said pinion includes a central hub portion with a front face having an annular surface thereon which is generally perpendicular to the pinion axis.

4. The structure of claim 3 wherein said lever includes a generally planar body portion and said obstruction portion comprises an ear extending upwardly with respect to said body portion.

5. The structure of claim 4 wherein said ear has thereon a leading inclined ramp surface which facilitates engagement of said ear and said pinion hub front face, and includes a rounded contact surface to prevent gouging of said pinion during ear and pinion contact and relative movement therebetween.

6. The structure according to claim 3, wherein said predetermined condition is engagement of a wheel drive mechanism of said mower, and said actuator means comprises a bowden wire linkage, one end of which is connected to pivotally actuate said lever, with the opposite end connected to shiftable means, cooperating with said linkage, the physical position of said shiftable means being indicative of engagement or disengagement of said drive mechanism.

7. A lawn starter interlock for use with a self-propelled lawn mower having a wheel drive mechanism thereon, said mower including a starting mechanism in which a starter pinion having a front face is friction urged to advance axially along a helical worm gear into engagement with a toothed engine flywheel to transmit rotational torque to said flywheel in response to drive from said worm gear, said starting mechanism further including base means mounted to said engine proximate said flywheel with a stationary shaft thereon which receives said worm gear and pinion, comprising:

a. obstruction means mounted to said base means for actuated movement into the path of pinion advance to contact said front face and overcome friction urging of said pinion along said worm gear and prevent pinion and flywheel engagement; and b. an actuator linkage connected between said wheel drive mechanism and said obstruction means to actuate said obstruction means when said wheel drive mechanism is engaged.

8. The structure of claim 7 wherein said obstruction means comprises a pivotable lever mounted on said base for pivotal movement about an axis parallel to said pinion axis, and having an obstruction portion thereon which pivots into and out of the path of advance of said front face.

9. The structure of claim 8 wherein said pinion has a central hub portion extending in the direction of pinion advance with respect to the body thereof; said front face comprises an annular surface on said central hub; and said obstruction portion includes a ramp surface thereon for contact with said front face.

* * * * *